United States Patent
Humphris (10) Patent No.: US 8,479,310 B2
(45) Date of Patent: Jul. 2, 2013

(54) DYNAMIC PROBE DETECTION SYSTEM

(75) Inventor: Andrew Humphris, Oxfordshire (GB)

(73) Assignee: Infinitesima Ltd., Oxfordshire (GB)

( * ) Notice: Subject to any disclaimer, the term of this patent is extended or adjusted under 35 U.S.C. 154(b) by 90 days.

(21) Appl. No.: 13/133,339

(22) PCT Filed: Dec. 11, 2009

(86) PCT No.: PCT/GB2009/051701
§ 371 (c)(1), (2), (4) Date: Jun. 7, 2011

(87) PCT Pub. No.: WO2010/067129
PCT Pub. Date: Jun. 17, 2010

(65) Prior Publication Data
US 2011/0247106 A1  Oct. 6, 2011

(30) Foreign Application Priority Data

Dec. 11, 2008 (GB) .................................. 0822603.7
Apr. 23, 2009 (GB) .................................. 0906987.3

(51) Int. Cl.
- *G01Q 20/02* (2010.01)
- *G01Q 10/04* (2010.01)
- *G01B 11/02* (2006.01)

(52) U.S. Cl.
USPC ............ 850/26; 850/1; 850/4; 850/6; 850/18; 850/19; 850/33; 850/55; 356/457; 356/493

(58) Field of Classification Search
USPC ........ 850/1, 4, 6, 18, 19, 26, 33, 55; 356/457, 356/493
See application file for complete search history.

(56) References Cited

U.S. PATENT DOCUMENTS

| | | | | |
|---|---|---|---|---|
| 5,224,376 A | * | 7/1993 | Elings et al. | 73/105 |
| 5,371,588 A | * | 12/1994 | Davis et al. | 356/489 |
| 5,955,661 A | * | 9/1999 | Samsavar et al. | 73/105 |
| 5,983,712 A | * | 11/1999 | Lindsay et al. | 73/105 |

(Continued)

FOREIGN PATENT DOCUMENTS

| EP | 0557743 | 9/1993 |
|---|---|---|
| EP | 1892727 | 2/2008 |

(Continued)

OTHER PUBLICATIONS

Erlandsson et al., "Atomic force microscopy using optical interferometry," J. Vac. Sci. Technol. A 6 (2), Mar./Apr. 1988, 266-270.

*Primary Examiner* — David A Vanore
(74) *Attorney, Agent, or Firm* — Volpe and Koenig, P.C.

(57) ABSTRACT

A dynamic probe detection system (29,32) is for use with a scanning probe microscope of the type that includes a probe (18) that is moved repeatedly towards and away from a sample surface. As a sample surface is scanned, an interferometer (88) generates an output height signal indicative of a path difference between light reflected from the probe (80a, 80b, 80c) and a height reference beam. Signal processing apparatus monitors the height signal and derives a measurement for each oscillation cycle that is indicative of the height of the probe. This enables extraction of a measurement that represents the height of the sample, without recourse to averaging or filtering, that may be used to form an image of the sample. The detection system may also include a feedback mechanism that is operable to maintain the average value of a feedback parameter at a set level.

40 Claims, 5 Drawing Sheets

U.S. PATENT DOCUMENTS

| Patent Number | | Date | Inventor | Class |
|---|---|---|---|---|
| 6,002,471 | A * | 12/1999 | Quake | 356/73 |
| 6,178,813 | B1 * | 1/2001 | Bruno et al. | 73/105 |
| 6,185,991 | B1 * | 2/2001 | Hong et al. | 73/105 |
| 6,220,084 | B1 | 4/2001 | Chen et al. | |
| 6,330,824 | B1 * | 12/2001 | Erie et al. | 73/105 |
| 6,650,419 | B2 * | 11/2003 | Hill | 356/500 |
| 6,657,216 | B1 * | 12/2003 | Poris | 250/559.22 |
| 7,177,030 | B2 * | 2/2007 | Leizerson et al. | 356/504 |
| 7,596,989 | B2 * | 10/2009 | Humphris et al. | 73/105 |
| 8,220,066 | B2 * | 7/2012 | Humphris | 850/6 |
| 8,296,856 | B2 * | 10/2012 | Humphris et al. | 850/1 |
| 2006/0005614 | A1 | 1/2006 | Sahin et al. | |
| 2007/0024295 | A1 * | 2/2007 | Humphris et al. | 324/754 |
| 2010/0235955 | A1 * | 9/2010 | Humphris | 850/6 |
| 2010/0275334 | A1 * | 10/2010 | Proksch et al. | 850/33 |
| 2011/0138506 | A1 * | 6/2011 | Humphris | 850/6 |
| 2011/0167525 | A1 * | 7/2011 | Humphris | 850/33 |
| 2011/0247106 | A1 * | 10/2011 | Humphris | 850/6 |
| 2011/0296561 | A1 * | 12/2011 | Humphris et al. | 850/4 |

FOREIGN PATENT DOCUMENTS

| | | |
|---|---|---|
| EP | 2017599 | 1/2009 |
| JP | 6082248 | 3/1994 |
| WO | 2009019513 | 2/2009 |
| WO | 2009147450 | 12/2009 |

* cited by examiner

DYNAMIC PROBE DETECTION SYSTEM

This application is a 35 USC §371 national phase application of PCT/GB2009/051701 filed Dec. 11, 2009 and which is incorporated herein by reference as if fully set forth.

This invention relates to the field of probe microscopy and, in particular, to a detection system used to monitor the position of an oscillating probe in relation to a sample surface.

The principle behind the scanning probe microscope (SPM) is to carry out a mechanical scan over a sample surface with a nanometric probe tip in order to produce an image of the sample. Features within the image result from variations in an interaction between the tip and the sample.

A particular example of an SPM is the atomic force microscope (AFM) in which the force interaction between the sample and the sharp tip of a probe is monitored. The probe of a typical AFM includes a very small cantilever that is fixed to a support at its base and with the tip at its opposite (free) end. When the probe tip is brought into close proximity with the sample, an interaction force develops between sample and tip. If the tip is in motion, for example oscillating, the interaction force will modify this motion in some way. If the tip is static, the force will displace the tip relative to the sample surface.

During the course of a scan, the strength of the interaction between tip and sample surface will change as the characteristics of the surface beneath the probe tip change. A three axis high-resolution scanner typically generates relative motion between the sample and the probe, driving either the sample and/or probe support. The effect of the interaction force on either the position and/or motion of the probe tip is monitored during the course of the scan. In standard AFM operation, the strength of the interaction force is held constant. That is, its effect on the probe is observed and a feedback system operates to adjust the separation of the sample and the base of the probe in response to any change so as to return the observed parameter to a predetermined value, the set point. Data associated with this adjustment (conventionally, vertical or "z" movement) is collected and may be used to construct an image of the sample across a region of its surface.

The interpretation of the image formed by the AFM will depend to some extent on the nature of the surface under investigation. Surface topography generally makes the most significant contribution to the image, the height of the sample being closely followed by the probe as it scans, but other characteristics such as surface hydrophobicity and hydrophilicity, visco-elasticity, etc. may also contribute. The probe and microscope may further be adapted to measure other sample properties, such as magnetic or electric fields, via suitable interaction forces.

AFMs may be designed to operate in a variety of imaging modes. In contact mode the probe remains in substantially continuous contact with the sample. In dynamic mode the probe is oscillated, bringing it periodically into close proximity or contact with the sample.

If a static tip is used to probe the surface then its position during the course of a scan is monitored using the effect that the interaction force has on the bend or deflection of the cantilever. As the interaction force between tip and surface changes, the tip is either pulled towards or pushed away from the surface. This tip movement is communicated to the cantilever part of the probe, which accordingly bends or flexes along its length. The AFM is set to measure the deflection of the cantilever with a position sensitive detector such as an optical lever system or other deflection detector as is well known in the art. Deflection, in this context, refers to the tilt of an upper surface of the probe, which is used by the AFM to provide an indication of cantilever bend.

Alternatively, the AFM may be operated in dynamic mode. The probe is oscillated at or near one of its resonant frequencies. Variations in the sample-probe interaction affect the motion of the probe. In particular, the amplitude, phase and frequency of these oscillations may be monitored and probe-sample separation adjusted in order to maintain constant average interaction.

The AFM can be configured and used in many different modes. It should be borne in mind that the above description of contact and dynamic modes is to provide a general introduction to the field of atomic force microscopy and is not intended to imply any limitation to the field of application of this present invention in any way.

Regardless of their mode of operation, AFMs can be used to obtain images on an atomic scale of a wide variety of samples in a range of environments (air, liquid or vacuum). Typically, they employ piezoelectric actuators, optical lever deflection detectors and very small cantilevers produced using silicon fabrication techniques. Their high resolution and versatility has led to their finding application in diverse fields such as industrial inspection, semiconductor manufacturing, biological research, materials science and nanolithography.

In this context, the tip (or probe tip) refers to the three dimensional, often conical or pyramidal structure that is located at the free end of the cantilever beam. The tip tapers to a point that is its closest point of interaction with a surface under interrogation. The cantilever is the beam itself, excluding the tip, that supports the tip at one end and at the other is held by the microscope apparatus. The cantilever and tip together are referred to as the probe.

The probe is generally (for AFM) fabricated from silicon or silicon nitride. Typically, the cantilever is around 50-200 μm long, 20-50 μm wide and around 0.2-2 μm thick, but this size can of course be varied according to application. The shape may also be varied: typically it is rectangular or triangular with, in the latter case, the tip in the vicinity of its apex. The tip is typically 5 μm at its base, 3-10 μm high and with an end radius of curvature of 10-20 nm. In use, the fine point at the end of the tip is oriented towards the sample.

A typical AFM comprises a moveable stage on which a sample to be investigated by a probe is mounted. The probe comprises a cantilever beam and a tip, which tapers to a fine point, and which is located towards one end of the cantilever beam. The other end of the cantilever beam is fixed to a mount. A z-positioning system, comprising piezoelectric drivers that are operable to move the stage and probe towards and away (z-direction) from each other is connected appropriately. When the AFM is operating in dynamic mode an oscillator is also connected to the probe, which drives it vertically in order to make intermittent contact with the sample surface. Further drivers are connected to either the mount, the stage or both and are operable to provide relative motion between the sample and probe in the plane (x,y) of the sample. A light source is arranged to emit a laser beam which is directed onto an upper surface (back) of the cantilever beam at the end at which the tip is mounted. Light reflected from the back of the cantilever propagates to a position sensitive detector (PSD), typically a split photodiode, which generates an output that is representative of the deflection of the cantilever. The output of detector is connected via a feedback controller to the z-positioning system.

The output signal from the PSD may be processed to extract quantities such as probe deflection, amplitude, phase or other parameters. The feedback controller adjusts the z-positioning system in accordance with one of the extracted quantities.

This invention is concerned with modes of AFM operation in which the probe oscillates towards and away from the sample surface. The dynamic mode of AFM operation, in which the probe oscillates at or near resonance, is therefore one example. The use of a moving probe to make intermittent contact reduces lateral forces between probe tip and sample. Such lateral forces may be destructive of soft samples or of a fragile probe tip. An example of a fragile tip is one with a high aspect ratio i.e. one with a relatively long length that is used to probe narrow troughs in sample surfaces. In addition an AFM operating in dynamic mode is often capable of extracting more material-specific information.

In taking an image of the sample, a prior art AFM operates in dynamic mode as follows. The tip is oscillated in a generally vertical direction and then, using the z-positioning system, moved towards the sample until the tip motion settles at a predetermined level. This level may be defined in terms of measured phase, amplitude or frequency but, whichever is used, its pre-determined value is the set point for feedback control. The oscillation of the cantilever is monitored using the laser beam and the detector.

The tip is now scanned across the surface of the sample, usually following a raster pattern. When the tip encounters a part of the surface with, for example, increased height, its motion is changed and the monitored parameter, for example amplitude, moves away from its set point. The feedback controller is set to adjust the vertical position of the probe mount to move it away from the sample and so to return the signal received from the detector to its set point. The probe is accordingly maintained in a position at which it has a constant average (over a number of oscillations) interaction with the surface.

In this way, the feedback of the microscope system ensures that the monitored parameter, in this example amplitude of probe vertical oscillation, is held substantially constant during the course of a scan. As the scan progresses, the vertical position of the mount set by the z-positioning system is monitored and used to construct the image. Typically, the image provides an indication of the height of the sample surface.

Recent advances in probe microscopy have led to much faster scanning techniques with more rapid data collection times. With this new generation of microscope, such as that described in PCT patent applications WO 02/063368 and WO 2004/005844, it is however becoming increasingly apparent that constraints imposed by the AFM components themselves are limiting image collection times.

In the prior art AFM described above, the tip is moved continuously across the sample surface to cover a set number of pixels per second. Cantilever oscillation is monitored and the feedback system makes continual adjustments to the vertical separation of probe and sample in order to maintain the probe at its preset oscillation level. The speed with which a change in oscillation can be detected and then vertical separation adjusted in response essentially sets the upper scanning speed limit for accurate AFM operation. In order for accurate information to be collected, the probe-sample interaction should be constant across all pixel positions. As a consequence, the probe-sample separation must be adjusted by the feedback system over a timescale shorter than that taken by the probe to collect image data corresponding to a single pixel position. That is, height adjustment must be made before the probe is moved to a new pixel position within the raster scan.

As the scanning speed is increased, the time spent by the probe at each pixel position is shorter. At some point a speed will be reached at which the probe cannot be returned to its preset oscillation level before it moves on to the next pixel area. The system does not have time to return to a steady feedback state. The feedback will accordingly lag behind the data collection system and height information (obtained from the vertical adjustment) will not reflect the true sample height at the pixel position. The pixel rate must be reduced either by increasing the size of each pixel, which reduces image resolution, or by slowing the scan, with a consequent increase in data collection time.

In order to reduce the effect of this limitation, attempts have been made to improve the speed of the feedback system. One approach, described in U.S. Pat. No. 6,189,374, makes use of two actuators to provide movement of the cantilever in the z direction. A first actuator drives the probe assembly and a second actuator, which is integral with the probe, is operable to move only the probe. The range of movement provided by this secondary actuator is smaller than that provided by the first but, as it is used to drive only the probe, its response time is faster. In this way, an initial adjustment to tip height may be made via the fast actuator with a slower, larger adjustment following in due course. This use of nested feedback loops with integral secondary actuator has however met with limited success. This is due, in part, to the difficulty interpreting the response of the combined feedback system and thus in determining the height of the tip. Without this information, surface topography (or other sample characteristic) cannot be accurately inferred.

In the dynamic mode described above, the probe is typically driven in flexural oscillation. That is the probe is fixed near its base and the cantilever is flexed about a lateral axis through its fixed point. This results in the tip following an arcuate path centred on the fixed point and intermittent contact is therefore made between tip and sample surface. Due to the small degree of oscillation, the tip motion can be considered as essentially vertical.

Alternative AFM implementations are based on driving the probe in different oscillatory modes in order to derive measurements of sample characteristics. For example, in shear force imaging the probe is oscillated laterally across the surface in order to extract information associated with lateral forces arising between probe and sample, for example shear force or force gradient measurements, that affect surface friction.

Torsional oscillation of a probe is described in U.S. Pat. No. 6,945,099 and U.S. Pat. No. 7,168,301. By torsional oscillation it is meant that the cantilever is oscillated about its longitudinal axis to effect a twisting motion. The tip therefore executes an essentially (due to the relatively small size of arcuate path) lateral movement across the surface of the sample. As with shear force imaging, lateral force interactions arising through the torsional movement may be used to extract material-related data that is complementary to that measured using flexural oscillations.

The prior art AFM systems described above are nulling systems. That is, it is only required to ensure that the oscillatory motion of the probe is held constant. Probe height information is obtained from the drivers that operate the feedback system, and not from the probe itself. This introduces an additional potential source of error: if the null value, for some reason, is not held constant, its variation will lead to errors in the extracted measurements and hence image.

An alternative approach is to measure the height of the probe tip directly as it moves across the sample surface. This approach avoids reliance on the proper functioning of the feedback system to provide an indirect measurement of surface height (or other characteristic) but it is not nearly so straightforward to implement with accuracy. As a consequence, this approach is not widely adopted. Examples of direct height measurement are described in U.S. Pat. No.

5,144,150 (Yoshizumi), EP 1 892 727 (Mitutoyo) and EP 2 017 599. The microscopes described in these documents all make use of an interferometer to extract information relating to the height of the probe.

U.S. Pat. No. 5,144,150 describes use of a contact probe to measure the configuration of a curved surface such as that of a spherical lens, of a Fresnel lens or of the patterning on a semiconductor. A problem in measuring such surfaces is that unacceptable pressure may be exerted on a sample surface as, for example, the cantilever beam is bent as the probe traces a particularly high region of the surface. The solution is to ensure that the bending of the cantilever beam is held substantially constant as the sample surface is scanned. This is achieved by connecting the base of the cantilever to a so-called optical probe. The optical probe is focused on the back of the cantilever beam, above the tip. If the beam bends, the tip moves away from the focal point of the optical probe. The optical probe is then moved physically so as to return the tip to its focal point and so to preserve the tip-optical probe separation, which in turn ensures that the cantilever returns to its original bend configuration. In other words, as in the previously-described prior art, a feedback system is used to maintain the cantilever at substantially constant deflection. The difference however is that sample height information is not inferred from this feedback system. This arrangement therefore is advantageous in that it removes the need for, and therefore potential source of errors from, interpreting and extracting a height measurement from the feedback system.

The arrangement described in U.S. Pat. No. 5,144,150 is restricted to scans using a relatively slow-moving probe. The feedback system to maintain cantilever deflection cannot react instantly to a change. Scanning speed is therefore limited in order that the time spent collecting an image pixel is greater than the response time of the autofocus feedback system. Moreover, although the interferometric measurement is based on a Doppler frequency shift from a moving probe, this information is only useful to extract height information in so far as velocity can provide an indication of sample surface position. That is, height is measured at set time intervals relative to the last known position of the probe in order that distance travelled can be inferred. This limits its application to a system in which small changes in sample height occur between pixels. It is not suitable for monitoring a probe whose oscillatory motion results in a rapidly varying height.

The two Mitutoyo publications, EP 1 892 727 and EP 2 017 599, are concerned with improving the accuracy with which probe microscopes can be operated and hence the resolution of the image. This is achieved by extracting a direct measurement of the height of the probe relative to a fixed reference point using interferometry. In one embodiment, a beam reflected from the back of the probe is interfered with a reference beam and the path difference extracted. This overcomes the problem of motion errors introduced by the scanners: the z direction motion of the probe tip arises purely from the shape of the sample surface. Any scanner error will cause the probe to bend, which cannot affect the direct height measurement.

The system described in EP 1 892 727 does not make use of any feedback system. That is, there is no adjustment made to prevent excessive bending of the probe. The system is accordingly limited to scanning very flat surfaces.

EP 2 017 599, published 21 Jan. 2009, after the priority date of this application, describes a development of the apparatus described in the earlier Mitutoyo document in which feedback is implemented. This feedback system is simplified in relation to the previously-described feedback AFM prior art in that a single sensor is used to detect both the constant force (feedback signal) and displacement (height) of the probe. A small vertical high-frequency oscillation (dither) is imparted to the probe as it scans. The amplitude of this vibration provides information as to the strength of the interaction force. The direct height signal measured by the interferometer accordingly has a low-frequency component that corresponds to the sample height variation superimposed with a high-frequency component that results from the dither. Filters are used to separate the two components in subsequent signal processing. The height of the base of the probe is adjusted in order to maintain the amplitude of the high-frequency component at a constant value. The speed of this arrangement is however still limited by the fact that the feedback system must be given sufficient time to respond to any changes in surface height. That is, dither amplitude is to be returned to its preset value between image data collection points. Data cannot be collected at a faster rate as, first, amplitude measurement requires monitoring the oscillation over a number of cycles (5-10 in this instance) and, secondly, the z driving system must be given time to adjust the probe position in order to restore the amplitude to its set value. Moreover, probe height information is obtained by filtering the detected signal to remove the component due to dither and so to leave a signal indicative of the average height of the probe. If therefore the probe height changes on a timescale shorter than an oscillation of the probe, this will introduce an error in the extracted height measurement. Similarly, the filter will have a finite response time, this being the time lag between variations at the input being followed at the output. Probe height variations on a timescale shorter than this are undetectable and will result in an error in the extracted height measurement.

U.S. Pat. No. 6,952,952 and U.S. Pat. No. 7,152,462 describe a recognition microscope in which an oscillating probe is monitored and used to detect specified agents on a sample surface. An antibody that will attach to certain sites on a sample surface is located on the probe tip. Probe oscillation towards and away from the surface is monitored. The lowest point in each oscillation period provides information as to the position of the surface and the highest point will determine one of two conditions: whether the probe connects with the surface by virtue of the antibody attachment or not. This apparatus does not measure height directly however, but the deflection or tilt of the back of the cantilever. The lowest deflection point is not only used to provide sample surface information but also for input to a feedback system to maintain average deflection. The topography data extracted therefore is a convolution of the position of the base of the probe, which is continuously adjusted by the feedback system, and the deflection of the probe. The use of a feedback system again limits the useful scan speed of this device.

In summary therefore, the prior art AFM systems are reliant on a feedback system to derive an image indirectly from the probe positioning system, which therefore limits scanning speed and which represents a potential source of errors. The use of a direct height measurement offers the potential for deriving height information independent of the position of the drivers. To date however, AFM imaging systems that employ an oscillating probe remain limited in their accuracy or speed of image collection by the requirements of a feedback system.

It is an object of the present invention to provide an alternative detection system for use with a scanning probe microscope that is capable of extracting information relating to the height of a sample surface as it is traced by a probe tip that oscillates above the surface, thereby varying the separation between tip and surface, with improved accuracy and/or speed than is available in the prior art.

Accordingly the present invention provides a detection system for use with a scanning probe microscope, the system comprising:

a light source for generating a beam to illuminate an oscillating probe that repeatedly approaches a sample surface, the probe comprising a cantilever with base and free ends, the free end supporting a sharp tip;

an interferometer arranged to detect a path difference between light reflected from the probe and a height reference beam and to output a height signal indicative of this path difference; and signal processing apparatus arranged to monitor the height signal and to derive a measurement for each oscillation cycle that is indicative of the height of the probe.

A detection system in accordance with the present invention is therefore capable of measuring the height of the probe directly (by interferometry) as it scans a sample surface. This is advantageous as it frees the system of the need to implement a feedback system. The detected height signal is sampled at a rate that ensures more than one measurement point is extracted per cycle of probe oscillation. This oversampling, which is preferably 10 times the probe oscillation frequency, and more preferably, 100 times, enables extraction of a measurement that represents the height of the sample, without recourse to averaging or filtering. Averaging and filtering, as described in EP 2 017 599, slow down the rate of data acquisition, which in turn limits the scanning speed or resolution of the imaging system. For example, the system described in EP 2 017 599 is reliant on oscillation amplitude being maintained at a steady value in order for the filtered signal to provide an accurate representation of sample height. The oscillation amplitude is maintained constant by the use of feedback, which accordingly sets a limit on scanning speed. If scanning speed is too high, errors arise in the extracted data measurement, reducing imaging accuracy.

The signal processing apparatus is preferably arranged to extract data from a position within each oscillation cycle that satisfies predetermined measurement criteria. This may be when the cycle indicates an extremal path difference, a minimum rate of change in path difference, or other suitable indicator. This ensures that the measurement point is extracted at a position most likely to reflect the true height of the sample. For example, at a minimum (or maximum) path difference it can be inferred that the probe is in contact with the sample surface. This improves the accuracy of information extracted by the detection system, which may then be used to generate an image of the sample surface. This image may reflect surface height or other material property of the surface.

Although there is no requirement to implement a feedback system with this invention, it is advantageous if the average height of the probe in relation to the sample is maintained. This is not to say that the limits of the prior art should be placed on this system. The feedback need not respond to return a selected feedback parameter to its set point. It is simply advantageous to maintain average probe-sample separation in that this reduces the chances of high forces arising in the event of a rapid change in sample topography, and consequent damage to the probe and/or sample. Feedback can be incorporated in a variety of ways. The signal processing apparatus may also be arranged to extract a feedback signal from the height signal. This feedback signal may be based on the amplitude, phase or frequency of probe oscillations. Alternatively the system may include a second detector arranged to receive a component of light reflected from the probe and to extract a feedback signal therefrom.

As noted above, feedback in this embodiment of the invention is not relied upon for each measurement point. Image data is extracted from the interferometric height measurement, regardless of the deflection/tilt of the cantilever. Not only does this increase the speed and available resolution of the imaging system but, in comparison with conventional AFMs, frees the system from the restrictions inherent in the use of a z driver. A conventional AFM system extracts a measured data point is derived from the position of the z driver as probe height is adjusted by the feedback system. This method requires a z positioning mechanism that can be calibrated accurately. Without the need to calibrate the positioning system, many more possibilities are opened up to providing probe height adjustment. This embodiment of the invention is particularly well suited to the use of probes with an integrated actuator. Such probes are practically difficult to calibrate and the calibration needs to be repeated when changing the probe. For example, this may be by piezo resistive coating or heating of a thermal bimorph probe by remote light source or electrical connection of a resistive heater. The detection system of the present invention is also ideal for implementation with the nested feedback loops described in U.S. Pat. No. 6,189,374 as it removes the need to calibrate multiple separate actuators.

The system preferably includes a beamsplitter arranged to separate light reflected from the probe into two components, one of which is input to the interferometer and the second of which is input to the second detector.

In implementing feedback, the second detector may be an interferometer arranged to detect a path difference between light reflected from the probe and a second height reference beam and to output a second height signal indicative of this path difference. The, or a second, signal processing apparatus is therefore arranged to extract the feedback signal from this second height signal, the feedback signal being based on information concerning the amplitude, phase or frequency of probe oscillations.

Alternatively, the second detector may a deflection detector, the output of which is processed by the, or a second, signal processing apparatus to extract the feedback signal. The feedback signal may be based on information relating to the amplitude, phase or frequency of probe oscillations.

The interferometer may be a homodyne interferometer and may include a means for generating a pair of phase quadrature interferograms. Fringe counting apparatus, ideally including fringe subdividing apparatus, is preferably arranged to produce an output dependent on a number of fringes detected at each interferogram.

Alternatively, the interferometer may be a heterodyne interferometer.

For either interferometric system, the height reference beam is preferably generated by reflection from a fixed reference point. The reference point may have a known, but variable, relationship to the position of the sample or is fixed relative to the sample.

Ideally, the signal processing apparatus includes an FPGA (field programmable gate array), which is able to process the high volume of data obtained when the microscope is operated most effectively, by oversampling each probe oscillation cycle. Alternatively, the signal processing apparatus includes a sample and hold circuit.

In an alternative aspect the present invention provides a scanning probe microscope for imaging a sample in accordance with an interaction between the sample and a probe, the microscope comprising driving means arranged to provide relative motion between the probe and the sample surface, an oscillator for oscillating the probe in a direction substantially perpendicular to the sample surface and a probe detection system as described above.

Preferably the probe has a cantilever section with spring constant in the range 0.5 to 2 $Nm^{-1}$.

The oscillator may be arranged to drive the probe in a flexural motion in order to provide intermittent contact with the surface. Alternatively, the tip may be offset from a longitudinal axis of the probe and the oscillator arranged to drive the probe in a torsional oscillation about its longitudinal axis. This latter arrangement is specifically advantageous to high-speed scanning operations: it enables a higher oscillation frequency with a low flexural spring constant, which reduces the force exerted by the probe on the surface in the event of large feedback error signals (resulting, for example, from a sudden change in surface height). Preferably, for torsional operation, the probe is T-shaped with the tip offset from the longitudinal axis by a distance of at least 3 μm.

The microscope preferably comprises an xy scanner arranged to provide relative motion between the probe and the sample surface in a plane substantially parallel to the sample surface and a z driver arranged to provide relative motion in a direction substantially perpendicular to the sample surface. A feedback system may incorporate the z driver and may be operable based on information generated by the detection system.

The z driver is ideally arranged to move the base of the probe. It could include an actuator integrated or partially integrated with the probe. The oscillator could be an actuator or multiple actuators and also could be integrated or partially integrated with the probe.

Embodiments of the invention will now be described by way of example only and with reference to the accompanying drawings.

Figure 1:
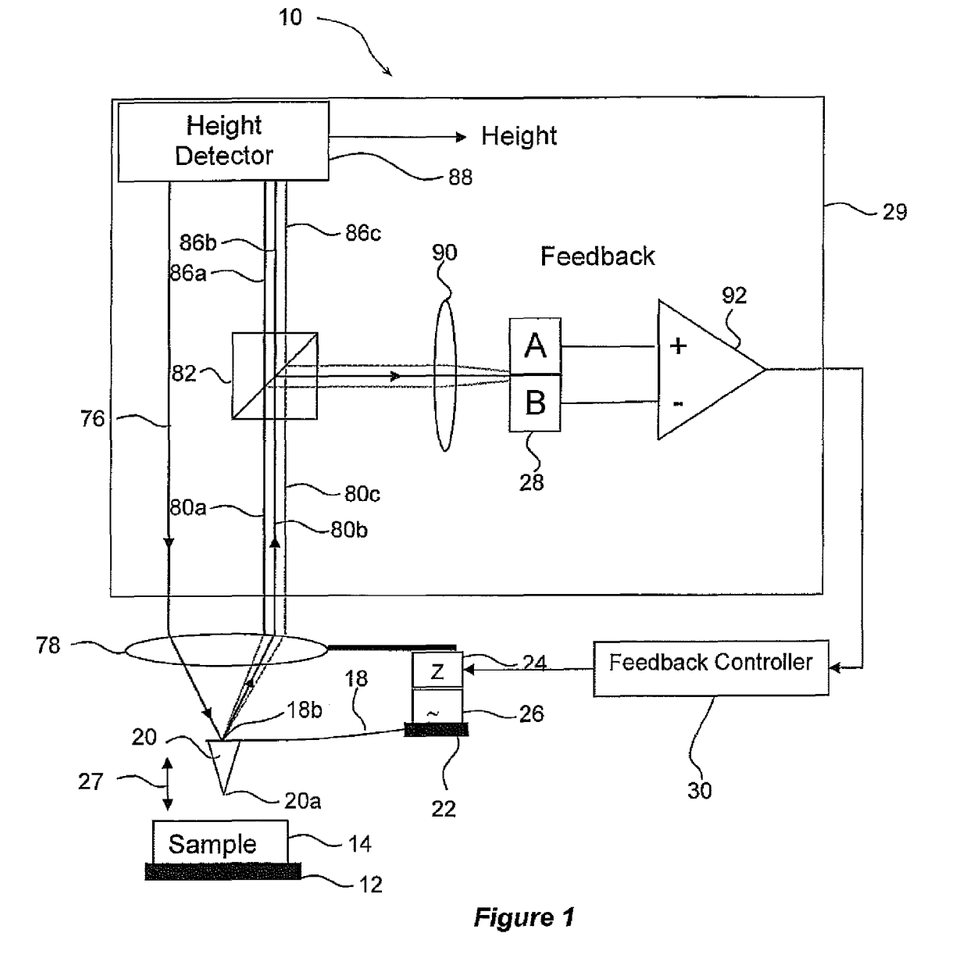
FIG. 1 is a schematic illustration of the components of an atomic force microscope with probe detection system in accordance with the present invention.

With reference to FIG. 1 there is shown schematically a modified implementation of an AFM, indicated generally by 10, in accordance with the present invention. The AFM apparatus shown comprises a moveable stage 12 adapted to receive a sample 14, whose surface is to be investigated by a probe 16. The probe 16 comprises a cantilever beam 18 and a tip 20, which tapers to a point 20a, and which is located towards one end of the cantilever beam 18. The other end of the cantilever beam 18 is supported by a mount 22.

One or more drive motors (24, not shown) are used to drive the sample 14 (together with the stage 12) and/or the probe 16 such that they can be scanned relative to each other in three dimensions: x, y and z directions. As is conventional in the field, the z axis of a Cartesian coordinate system will be taken to be that perpendicular to a plane occupied by the sample 14. That is, the strength of the interaction force between probe 16 and sample 14 is dependent both on the xy position of the tip 20 over the sample 14 (the pixel it is imaging), and also on its height above it.

A z-positioning system 24 comprises piezoelectric drivers that are operable to move the tip 20 towards and away from (z-direction) the sample 14. In this embodiment, the z-positioning system is connected to the probe mount 22. Alternatively, it may be connected to the sample stage 12 and it may comprise non-piezoelectric driving mechanisms such as a voice coil or thermal bimorph actuator. Further motors are connected to either the mount 22, the stage 12 or to both and are operable to provide relative motion between the sample 14 and tip 20 in the plane (x,y) of the sample, such that the tip 20 is scanned raster fashion, or otherwise, over the sample 14.

An oscillator 26 is attached or connected to the probe and is arranged to generate a flexural oscillating movement of the probe that drives it in an essentially vertical direction, as indicated by arrows 27. The oscillator 26 shown in this FIG. 1 is a piezoelectric actuator mounted at the base of the probe. Alternatively, one of a number of other drive mechanisms that are known to be suitable for this purpose may be used. For example, a magnetic or electric field with suitably adapted probe, inclusion of a thermal bimorph in the probe, or an acoustic excitation. The probe movement may be at resonance or driven off resonance or be simply any motion towards and away from the surface. It may be periodic, near-periodic or even aperiodic. It is however such as to move the probe tip repeatedly towards and away from the sample surface.

The probe 16 is a low-mass AFM probe and, during a scan, the tip 20 is brought into close proximity with the sample surface. A probe detection mechanism 29, which will be explained in more detail below, is, in this embodiment, arranged to obtain an indication of both the vertical (z) displacement of a point 18b at the back of the cantilever above the tip 20 and its deflection (tilt). It is of course apparent that, as a result of the oscillations, any indication provided by the probe detection mechanism will be an instantaneous observation. Both the vertical (z) displacement and the tilt arise from two contributing sources: a first component reflecting the surface property to which the probe is sensitive, typically surface topography, and a second, higher frequency, component contributed by the vertical oscillation. Data relating to the vertical displacement is analysed and output to a display (not shown). Information relating to the tilt/deflection of the back 18b of the cantilever is input to a feedback controller 30, which in turn is connected to the drive mechanism of the z-positioning system 24. The feedback controller 30 includes a signal processor arranged to extract a feedback parameter from its input information and to provide a consequential control signal to the z drivers.

The probe 16 is generally (for AFM) fabricated from silicon or silicon nitride and formed to a shape and size as described previously in relation to the prior art.

In taking an image of the sample, the AFM 70 is operated in dynamic mode as follows. The probe 16 is set into oscillatory motion by the oscillator 26.

Using the z-positioning system 24 and further drivers, the sample 14 is first brought into intermittent contact with the tip 20. Conventionally, in AFM terminology, the tip 20 is said to be in contact with the sample 14 when the atomic interaction force is in the repulsive regime. The mount 22 is lowered, moving the probe 16 towards the sample 14 whilst, in this embodiment, the detection system 29 monitors the oscillating and time-varying deflection of the cantilever. When the amplitude of deflection oscillation reaches a predetermined level the movement of the mount, under the control of the feedback controller, is stopped. This predetermined amplitude level is the set point for the feedback controller 30.

As the scan progresses, the tip 20 moves up and down as surface height/interaction force varies. Superimposed on this surface-induced motion is a higher frequency component arising from the oscillatory motion of the probe. The amplitude, phase and frequency of this oscillatory component of the tip's motion will all be dependent on both the oscillator settings and the interaction force between surface and tip. Similarly, the tilt of the cantilever is a superposition of a component arising from interaction with the sample surface and a second component due to probe oscillations. The amplitude, phase and frequency of the second component are affected by the probe's position with respect to the surface. As the scan progresses, the amplitude of the ac component of the deflection is monitored. Any changes alter the signal fed to the feedback controller 30 and the z-positioning system 24 is adjusted accordingly.

The operation of the detection system 29 in accordance with the present invention will now be described in more detail. A light source (not shown) emits a laser beam 76 that is focused by objective lens 78 onto the back 18b of the cantilever. Reflected light 80a, b, c is collected by the lens 78 and directed towards a non-polarising beamsplitter 82. As can be seen from FIG. 1, the instantaneous tilt of the cantilever 18b affects the angle at which light is reflected. At one position of the probe, the reflected beam follows path 80b. If however, the cantilever back 18b is tilted leftwards (relative to the figure) the reflected beam 80a will be deflected anticlockwise and a rightwards tilt will deflect the reflected beam 80c clockwise. As the back 18b of the cantilever is located at or near the focal point of the lens 78, an angular variation in the reflected beam is converted to a lateral displacement after the lens. That is, regardless of angular tilt, the reflected beam 80a, b, c will propagate parallel to the optical axis of the detection system, a leftwards tilt producing a leftwards lateral displacement and a rightwards tilt generating a rightwards displacement relative to the central position.

The beamsplitter 82 is arranged such that it reflects through 90° substantially half 84a, b, c the light incident on it and transmits the other half 86a, b, c. The transmitted component 86a, b, c is input to an interferometer 88. The operation of this interferometer will be described in more detail with reference to FIG. 2. In summary though, the reflected beam 86a, b, c is interfered with a reference beam reflected from the upper surface of the stage 12. Alternatively, another fixed point with known relationship to the stage surface may be used. This provides a measure of the path difference between the two beams and hence an indication of the instantaneous height of the back 18b of the cantilever above the stage surface. From this data, information as to surface height may be extracted to form an image.

The components 84a, b, c reflected from the beamsplitter 82 are condensed by lens 90 onto a deflection detector 28. The detector 28 is, in this embodiment, split across its length into independent detector areas A and B. The output signals generated from these areas are input to a difference amplifier 92, which outputs a signal equal to the difference between the two channels. The detector 28 is aligned with the collection optics such that the reflected light 80b, 84b is distributed between channels A and B. A leftwards tilt of the back 18b of the cantilever means that the signal from the detector 28 increases in channel B, leading to a fall in output from the difference amplifier 92. Conversely, a rightwards tilt means that channel A receives the signal increase and a rise in output is generated by the difference amplifier 92. As the probe oscillates, the difference between the channel A and channel B signals will produce a time-varying signal at the amplifier 92 output. This output signal represents the time-varying deflection of the probe. The amplitude of this signal accordingly provides a direct indication of the amplitude of the probe oscillations. The amplifier 92 output can therefore be used as the basis for a feedback signal fed to the feedback controller 30. The feedback controller 30 operates the z-positioning system 24 in order to maintain the amplitude signal at its set point.

In alternative embodiments, the deflection detector 28 may be set up to monitor other parameters such as the phase and/or frequency of the probe oscillations.

In a further embodiment, the average (dc) deflection may be monitored by the deflection detector 28. The deflection detection system is set up as described above. As the probe oscillates, the signal output from the difference amplifier 92 will also oscillate. A filter (not shown) is included in this embodiment, located between the difference amplifier 92 and the feedback controller 30. The filter parameters are such that the filter output corresponds to the average value of the difference signal over one or more oscillation periods. This average signal in turn provides an indication of the average probe position over a number of cycles.

Independently of the feedback signal, or equivalently deflection of the cantilever, the true probe height above the surface is measured by the interferometric height detection system. The feedback system is accordingly used to ensure that the average probe-sample interaction, observed through its effect on some parameter of the deflection or height, is maintained at a constant level.

It is important that the light 76 of the detection system is focused on the back 18b of the cantilever. For this reason, the z-positioning system is also connected to the objective lens 78 and arranged such that if the probe 16 is raised or lowered, the lens 78 is raised or lowered by an equal amount. In an alternative embodiment, the objective lens 78 is selected to have a depth of focus greater than the range of movement expected from the tip. There is accordingly no need to adjust the position of the objective with respect to the tip 20.

In further embodiments the (x,y) scanning drive mechanisms (not shown in the Figure) and the z-positioning system 24 can be replaced by any suitable driving means, which may not be piezoelectric. The drivers may be attached to the sample stage 12, probe mount 22 or a combination of both.

The detection system 29 described above may incorporate alternative known means of measuring deflection of the cantilever 18. For example, the probe may be formed with integrated piezo-resistive sensors. A height detection system similar to that used to measure the height of the cantilever may also be used to measure deflection. That is, an interferometer is used to measure the height of the tip 20 relative to the height of the base of the cantilever.

Figure 2:
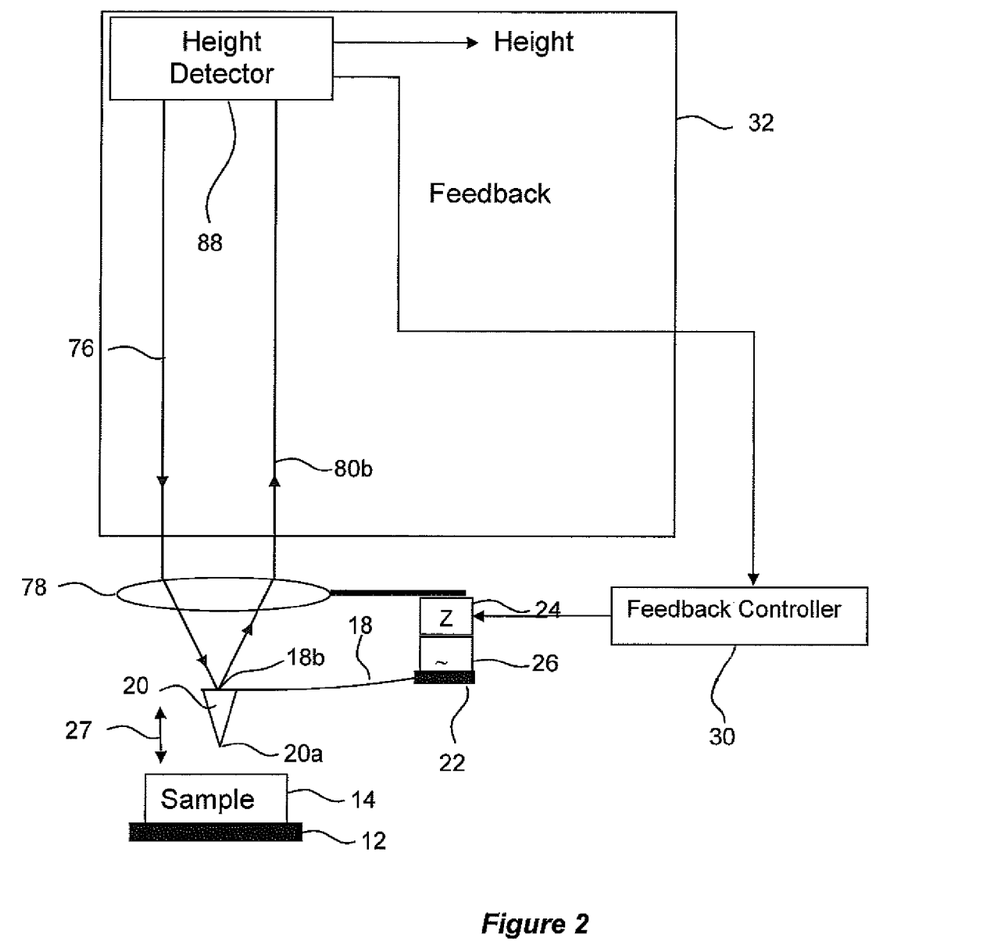
FIG. 2 is a schematic illustration of the components of an atomic force microscope with a second embodiment of a probe detection system in accordance with the present invention.

An example of a detection system 32 set up to utilise a still further parameter for feedback is show in FIG. 2. In this Figure, components common to the system shown in FIG. 1 are like-referenced. In this embodiment probe deflection is not detected and so the detection system 32 does not include the deflection detector 28 and associated optical elements 82, 90, 92. All light 80b reflected from the probe is transmitted to the interferometer 88. Interference patterns are again generated between the reflected beam 80b and the reference beam. The interference signals are processed to provide a path difference, which is indicative of the height of the back of the cantilever above the stage surface. This height signal will contain an oscillating component that arises through the oscillations of the probe. The amplitude, phase or frequency of these oscillations in the height signal may be extracted from the interferometric measurement of probe height and used as the parameter on which to base feedback. If amplitude is used, for example, the amplitude of the oscillations will simply be the amplitude of the height variation at the oscillation frequency. Alternatively, a peak-to-peak amplitude can be extracted from the difference between maximum and minimum height measurements during each oscillation period.

Whichever feedback system is implemented, what is important is that the average value of the selected feedback parameter is maintained by the feedback system at its set point. There is no requirement to implement feedback such that the set point value is established for each pixel position. The feedback parameter may be extracted during each probe oscillation cycle, but the feedback null position need not be reached before the next measurement is extracted. The average value at which the probe motion is maintained is typically derived over multiple probe oscillation cycles.

The light source used with this embodiment is a laser source, but alternative sources are available. For interferometric detection the light should be coherent, to a degree required by the specifics of the interferometer.

Figure 3:
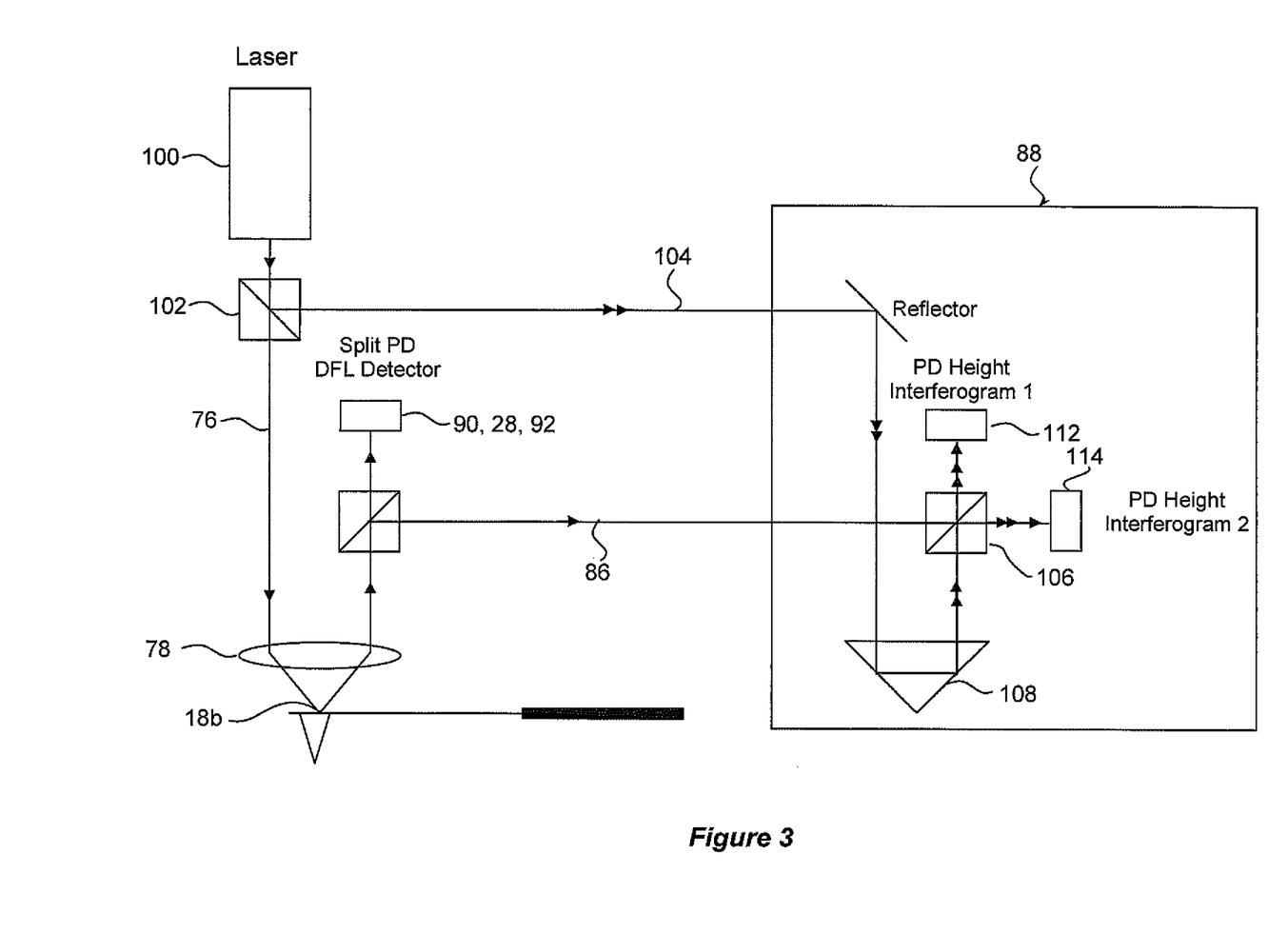
FIG. 3 is a schematic illustration of an interferometric height detection system for use with the present invention.

With reference to FIG. 3, there is shown in further detail the optical components of the first embodiment of the detection system 29, as shown in FIG. 1. Light from a laser source 100 is split by a second 102 beam splitter into the incident beam 76 and a reference beam 104. The incident beam 76 is focused by the objective lens 78 on the back 18b of the cantilever. After reflection from the cantilever, the beam 80 is split by the first 82 beam splitter. As described previously, the first component 84 is directed to the deflection detector 90, 28, 92 and the second component 86 to the interferometer 88.

Inside the interferometer, the beam 86 that has been reflected from the cantilever 18b is split by a beam splitter 106. The reference beam 104 is directed onto a suitably positioned retroreflector 108 and thereafter to the beam splitter 106. The retroreflector 108 is aligned such that it provides a fixed optical path length relative to the vertical (z) position of the sample. The beamsplitter 106 has an energy absorbing coating and splits both incident 86 and reference 104 beams to produce first and second interferograms with a relative phase shift of ~90°. The two interferograms are detected respectively at first 112 and second 114 photodetectors.

Ideally, the photodetector signals are complementary sine and cosine signals with a phase difference of 90°. Further, they should have no dc offset, have equal amplitudes and only depend on the position of the cantilever and wavelength λ of the laser. Known methods are used to monitor the photodetector 112, 114 outputs while changing the optical path difference in order to determine and to apply corrections for errors arising as a result of the two photodetector signals not being perfectly harmonic, with equal amplitude and in phase quadrature. Similarly, dc offset levels are also corrected in accordance with method known in the art.

These photodetector signals are suitable for use with a conventional interferometer reversible fringe counting apparatus and fringe subdividing apparatus, which may be provided as dedicated hardware or as a programmed computer. Phase quadrature fringe counting apparatus is capable of measuring displacements in the position of the cantilever to an accuracy of λ/8. That is, to 66 nm for 532 nm light. Known fringe subdividing techniques, based on the arc tangent of the signals, permits an improvement in accuracy to the nanometer scale or less.

Interferometric methods of extracting the path difference between two coherent beams are well known in the art and so will not be described in any further detail.

In the embodiment described above, the reference beam is arranged to have a fixed optical path length relative to the z position of the sample. It could accordingly be reflected from the surface of the stage on which the sample is mounted or from a retroreflector whose position is linked to that of the stage, as described above. The reference path length may be greater than or smaller than the length of the path followed by the beam reflected from the probe. Alternatively, the relationship between reflector and sample z position does not have to be fixed. In such an embodiment the reference beam may be reflected from a fixed point, the fixed point having a known (but varying) relationship with the z position of the sample. The height of the tip is therefore deduced from the interferometrically-measured path difference and the z position of the sample with respect to the fixed point.

The interferometer described herein is one example of a homodyne system. The particular system described offers a number of advantages to this application. The use of two phase quadrature interferograms enables the measurement of cantilever displacement over multiple fringes, and hence over a large displacement range. The use of a phase-shifting coating on the beamsplitter 106 renders the interferometer insensitive to polarisation effects, for example arising from changes in polarisation as the light beam is reflected from the cantilever. An example of an interferometer based on these principles is described in U.S. Pat. No. 6,678,056. Alternative interferometer systems capable of measuring a change in optical path length may also be employed with this invention. A suitable homodyne polarisation interferometer is described in the above referenced EP 1 892 727 and a suitable heterodyne interferometer is described in the above referenced U.S. Pat. No. 5,144,150.

It is clear that the above-described probe microscope is capable of operating at scanning speeds in excess of the limit imposed by feedback. The height information extracted by the detection system represents the true instantaneous height of the probe. This is independent of the position of the base of the probe relative to the tip i.e. of the deflection. Accordingly, although the deflection (or other feedback parameter) is permitted to vary about its average value during the course of a scan, this is separate to the height measurement by interferometry.

Figure 4:
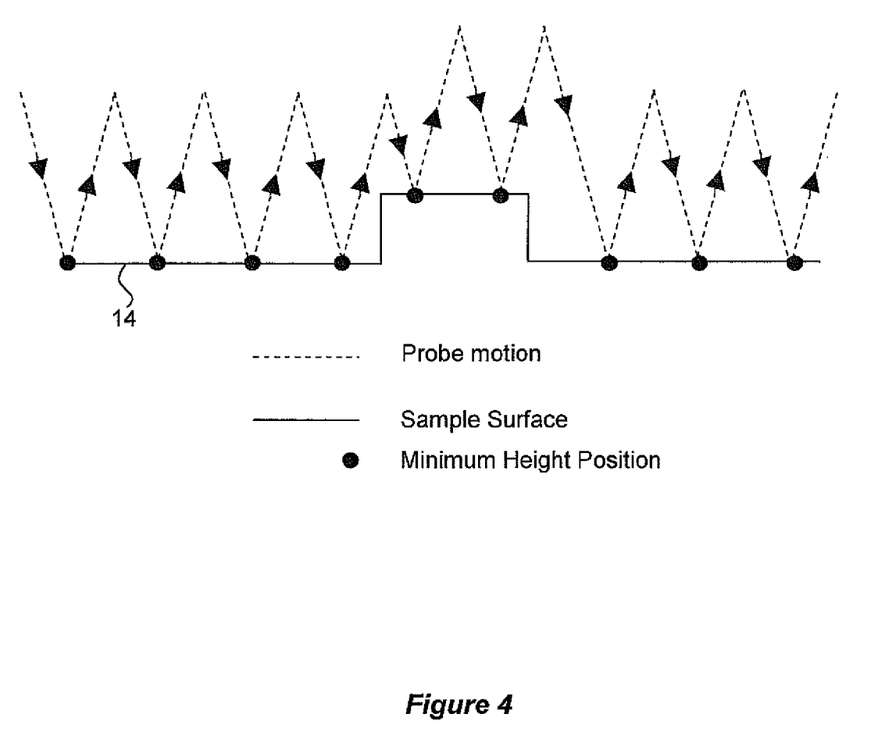
FIG. 4 is a schematic representation of oscillatory probe motion in a dynamic mode of operation of an AFM in accordance with this invention.

With reference to FIG. 4, the motion of the probe as it makes intermittent contact with the sample surface is illustrated schematically. This illustration is only an example representation of probe motion. It may follow many waveforms, depending on the movement imparted to the probe and, to some extent, the interaction between probe and sample surface. Typically, the probe oscillations will follow a sinusoidal waveform.

It will be appreciated that the height information extracted by the detection systems 29, 32 contains accurate information relating to the height of the probe, but this must be related to features of the sample surface in order for useful information to be obtained. In theory, it can be seen from FIG. 4 that the lowest point of each oscillation cycle represents the true height of the surface. Accordingly a data processing system is set up in order to be able to find the lowest height measurement for each period of probe oscillation and this is then output to provide a measurement that can be used to form an image. That is, the lowest point in each oscillation cycle is representative of the position of the sample surface. Other points on the high-frequency oscillation component of the signal may also be used to provide a meaningful indicator of sample surface position. For example, the point of minimum velocity during the lower half of the oscillation cycle may be extracted by the data processing system. If imaging a compliant surface then the probe velocity, or equivalently rate of change of the height signal, will fall as it encounters and begins to deforms the surface. In this instance a measure of sample height may be extracted from the point of each height oscillation at which a variation in the rate of change of probe height is observed.

This method of determining the position of the surface is far more accurate than that described in EP 2 017 599, which uses filters to separate the low frequency sample height variation from the higher frequency dither oscillations. This essentially deconvolution operation extracts the average low frequency signal, on which the high frequency signal is superimposed. This is not however a true measure of surface height and this can lead to inaccuracies at high scanning speeds or if an error is introduced into the null feedback parameter, which results in a variation in its value. In order that the filtered average signal can provide an accurate indication of sample height, the feedback parameter must return to its null value between measurement positions. The probe height is a sum of the sample height and amplitude of the dither oscillations. If the amplitude of the dither oscillations changes, then the probe's average position relative to the sample surface will also change. That is, a new probe position will be observed, without there being any actual change in surface height. In order to avoid this error, the feedback parameter must be kept at its null value. For accurate data collection therefore, the system must have time to adjust to minimise any error in the feedback system, which therefore precludes operation at high scanning speeds. In addition, if the speed of the scan is such that sample height varies on a timescale shorter than an oscillation of the probe, or indeed on a timescale shorter than the filter response, this variation cannot be measure by the prior art system and, in fact, introduces an error into the sample height measurement.

A field programmable gate array (FPGA) is configured in order to provide the necessary processing capability. In a dynamic mode AFM probe oscillation frequency is typically at around 40 kHz to 400 kHz. In a microscope set up in accordance with this invention, sampling frequency for data recording is in the region of 40 MHz. Consequently, each cycle of probe oscillation is sampled in the region of 100 to 1000 times, which is more than sufficient to determine the minimum height accurately. The point of closest approach to the surface in each probe oscillation cycle may be extracted from the interferometric data: either the longest or shortest path difference, depending on whether the reference path length is shorter or longer respectively than the path length of the beam reflected from the probe.

Alternative data processing systems may also be used with this invention. For example, a sample and hold circuit or a high-speed digital signal processor are also capable of providing the required signal processing capabilities.

The above oversampling rate of 100 to 1000 may be reduced without significant loss of accuracy. Clearly however, the sampling frequency must be higher, and ideally more than 10 times higher, than the frequency at which the probe is oscillated in order to be able to extract meaningful data.

Figure 5A:
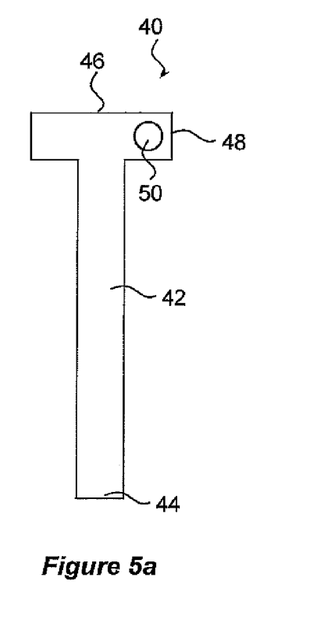
FIGS. 5(a) and 5(b) are respectively top plan and side views of a probe suitable for use with an AFM operating in an alternative dynamic imaging mode in accordance with this invention.

Referring now to FIGS. 5(a) and (b) there is shown a T-shaped probe 40 suitable for use with an AFM operating in an alternative dynamic mode in accordance with this invention. FIG. 5(a) shows a top plan view and FIG. 5(b) a side view. The probe 40 comprises a cantilever with longitudinal arm 42 extending from a base 44 to a free 46 end. A cross bar 48 extends laterally across the arm 42 at the free end 46, thereby forming a T-shape. A tip 50 is asymmetrically located on and supported by the cross bar 48.

Figure 5B:
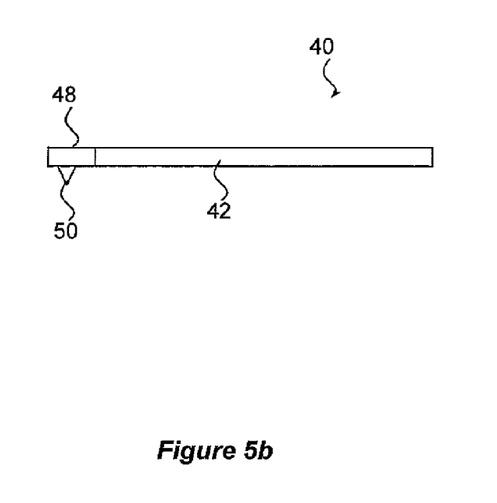

T-shaped probes 40 are known in the prior art and have been driven flexurally in AFM dynamic mode. Their shape is such that they are particularly useful for extracting data relating to material properties of a sample.

In an embodiment of an AFM in accordance with this invention, the probe 40 is oscillated torsionally. That is, the probe 40 is oscillated at or near resonance about its longitudinal arm 42. In this way, the offset tip 50 describes a small arc that moves it vertically towards and away from the surface, making intermittent contact therewith. In use therefore, torsional oscillation is established in the probe 40, which is then moved towards the surface to the feedback set point in order to commence a scan. Thereafter, the probe is monitored at the position of the tip and data relating to tip position and motion is extracted in the same way as described in connection with the embodiments depicted in FIGS. 1 to 4.

The tip 50 in FIG. 5 is shown to the right of the cross bar 48, but could equally be offset to the left. The minimum offset distance is of the order 3 µm, given current probe fabrication tolerances. Alternatively, the probe may not be T-shaped but rectangular with an offset tip.

Intermittent contact mode established by torsional oscillation offers several advantages over other modes when used in high speed microscope scanning. The torsional resonance is at a higher frequency than the flexural resonance. Ideally, the torsional oscillation frequency is around 0.5-1 MHz and flexural spring constant is of the order 0.5-2 $Nm^{-1}$. This means that the rate at which the surface is sampled is higher for torsional operation. This can therefore be used to increase scanning speed or to improve resolution. Another problem encountered in dynamic imaging is that, on occasion, a large error in the feedback system may result in a large force being applied to the surface as flexural bending (deflection) increases to accommodate the error in the sample-probe base separation. Use of the torsional mode of oscillation to provide the dynamic oscillation means that the stiffness of the flexural bending can be reduced, without any loss of dynamic functionality. This lessens the effect of errors on applied surface force.

The invention claimed is:

1. A detection system for use with a scanning probe microscope, the system comprising:
a light source for generating a beam to illuminate an oscillating probe that repeatedly approaches a sample surface, the probe comprising a cantilever with base and free ends, the free end supporting a sharp tip;
an interferometer arranged to detect a path difference between light reflected from the probe and a height reference beam and to output a height signal indicative of this path difference; and
a signal processing apparatus arranged to monitor the height signal and to derive a measurement for each oscillation cycle that is indicative of the height of the probe.

2. A detection system according to claim 1 wherein the signal processing apparatus is arranged to extract data from a position within each oscillation cycle that satisfies predetermined measurement criteria.

3. A detection system according to claim 2 wherein the position within each cycle is at an extremal path difference.

4. A detection system according to claim 2 wherein the position within each cycle is a minimum rate of change in path difference.

5. A detection system according to claim 2 wherein the extracted data is used to construct an image of the sample surface.

6. A detection system according to claim 1 wherein the measurement is indicative of material properties of the sample.

7. A detection system according to claim 1 wherein the rate at which the height signal is sampled is at least 10 times the probe oscillation frequency.

8. A detection system according to claim 7 wherein the rate at which the height signal is sampled is at least 100 times the probe oscillation frequency.

9. A detection system according to claim 1 wherein the height signal has a bandwidth greater than the probe oscillation frequency.

10. A detection system according to claim 1 wherein the signal processing apparatus is also arranged to extract from the height signal a feedback signal for use in returning the probe to a set average height above the surface.

11. A detection system according to claim 10 wherein the feedback signal is based on the amplitude, phase or frequency of probe oscillations.

12. A detection system according to claim 1 wherein the system includes a second detector arranged to receive a component of light reflected from the probe.

13. A detection system according to claim 12 wherein the second detector is arranged to extract a feedback signal from this received component.

14. A detection system according to claim 12 wherein the system includes a beamsplitter arranged to separate light reflected from the probe into two components, one of which is input to the interferometer and the second of which is input to the second detector.

15. A detection system according to claim 12 wherein the second detector is an interferometer arranged to detect a path difference between light reflected from the probe and a second height reference beam and to output a second height signal indicative of this path difference, and wherein a second signal processing apparatus is arranged to extract the feedback signal from this second height signal, the feedback signal being based on information concerning the amplitude, phase or frequency of probe oscillations.

16. A detection system according to claim 12 wherein the second detector is a deflection detector, the output of which is processed by a second signal processing apparatus to extract the feedback signal.

17. A detection system according to claim 16 wherein the feedback signal is based on information relating to the amplitude, phase or frequency of probe oscillations.

18. A detection system according to claim 16 wherein the feedback signal is based on information relating to the average deflection of the probe over multiple oscillations.

19. A detection system according to claim 16 wherein the interferometer is a homodyne interferometer.

20. A detection system according to claim 19 wherein the interferometer includes a means for generating a pair of phase quadrature interferograms.

21. A detection system according to claim 20 wherein the system includes fringe counting apparatus arranged to produce an output dependent on a number of fringes detected at each interferogram.

22. A detection system according to claim 21 wherein the fringe counting apparatus includes fringe subdividing apparatus.

23. A detection system according to claim 20 wherein the means for generating a pair of phase quadrature interferograms is a beamsplitter with phase-splitting coating.

24. A detection system according to claim 1 wherein the interferometer is a heterodyne interferometer.

25. A detection system according to claim 1 wherein the height reference beam is generated by reflection from a fixed reference point.

26. A detection system according to claim 25 wherein the reference point has a known, but variable, relationship to the position of the sample.

27. A detection system according to claim 25 wherein the reference point is fixed relative to the sample.

28. A detection system according to claim 25 wherein the signal processing apparatus includes an FPGA.

29. A detection system according to claim 25 wherein the signal processing apparatus includes a sample and hold circuit.

30. A scanning probe microscope for imaging a sample in accordance with an interaction between the sample and a probe, the microscope comprising driving means arranged to provide relative motion between the probe and the sample surface, an oscillator for oscillating the probe in a direction substantially perpendicular to the sample surface and a probe detection system in accordance with claim 1.

31. A scanning probe microscope in accordance with claim 30 wherein the probe includes a cantilever arm with spring constant in the range 0.5 to 2 $Nm^{-1}$.

32. A scanning probe microscope in accordance with claim 30 wherein the oscillator is arranged to drive the probe in a flexural motion.

33. A scanning probe microscope in accordance with claim 30 wherein the tip is offset from a longitudinal axis of the probe and the oscillator is arranged to drive the probe in a torsional oscillation about its longitudinal axis.

34. A scanning probe microscope in accordance with claim 33 wherein the probe is T-shaped.

35. A scanning probe microscope in accordance with claim 33 wherein the tip is offset from the longitudinal axis by a distance of at least 3 μm.

36. A scanning probe microscope for imaging a sample in accordance with claim 30 wherein
the driving means comprises an xy scanner arranged to provide relative motion between the probe and the sample surface in a plane substantially parallel to the sample surface and a z driver arranged to provide relative motion in a direction substantially perpendicular to the sample surface.

37. A scanning probe microscope in accordance with claim 36 wherein the microscope also includes a feedback system incorporating the z driver and that is operable based on information generated by the detection system.

38. A scanning probe microscope according to claim 37 wherein the z driver is arranged to move the base of the probe.

39. A scanning probe microscope according to claim 37 wherein the z driver includes an actuator integrated or partially integrated with the probe.

40. A scanning probe microscope according to claim 30 wherein the oscillator is an actuator.

* * * * *